(12) United States Patent
Karabaic (10) Patent No.: US 6,758,675 B2
(45) Date of Patent: Jul. 6, 2004

(54) BASE TEN PRIMARY TEACHING KIT

(76) Inventor: James M. Karabaic, 1632 Waterston Ave. No. 104, Austin, TX (US) 78703

( * ) Notice: Subject to any disclaimer, the term of this patent is extended or adjusted under 35 U.S.C. 154(b) by 0 days.

(21) Appl. No.: 10/446,310

(22) Filed: May 28, 2003

(65) Prior Publication Data

US 2004/0023196 A1 Feb. 5, 2004

Related U.S. Application Data

(63) Continuation-in-part of application No. 10/061,484, filed on Feb. 4, 2002, now Pat. No. 6,595,778.

(51) Int. Cl.[7] .............................................. G09B 19/02
(52) U.S. Cl. ...................... 434/189; 434/191; 434/195; 434/188; 434/207; 434/209
(58) Field of Search ................................ 434/188, 189, 434/195, 199, 204, 191, 205, 207

(56) References Cited

U.S. PATENT DOCUMENTS

| | | | | |
|---|---|---|---|---|
| 1,471,437 A | * | 10/1923 | Wood ......................... | 434/195 |
| 2,494,469 A | * | 1/1950 | Morris ........................ | 434/196 |
| 2,835,988 A | * | 5/1958 | Hilkene ....................... | 434/195 |
| 3,229,388 A | * | 1/1966 | Smith .......................... | 434/195 |
| 3,410,002 A | * | 11/1968 | Mulholland et al. ......... | 434/195 |
| 3,743,750 A | * | 7/1973 | Hurue ......................... | 434/191 |
| 5,297,965 A | * | 3/1994 | Manancero ................. | 434/195 |
| 5,769,639 A | * | 6/1998 | Foster ......................... | 434/159 |
| 5,927,718 A | * | 7/1999 | Heaton ........................ | 273/272 |
| 6,595,778 B1 | * | 7/2003 | Karabaic ..................... | 434/189 |

* cited by examiner

Primary Examiner—Derris H. Banks
Assistant Examiner—Dmitry Suhol
(74) Attorney, Agent, or Firm—Rick B. Yeager (57) ABSTRACT

A kit containing an Instructor unit sized for presentation to a group and multiple Child training units both set up to allow students to visually model and relate addition, subtraction, multiplication, and division in primary mathematics. The manipulative units include a plurality of colored cubes arranged in slots so that the movement of particular cubes from one side of the slots to the other side represents numbers in a mathematical operation. Tally trays of five slots may be removed from the device and hold up to 10 cubes to demonstrate regrouping operations on a mat.

17 Claims, 13 Drawing Sheets

BASE TEN PRIMARY TEACHING KIT

RELATED APPLICATIONS

This application is a continuation-in-part application of U.S. application Ser. No. 10/061,484 filed Feb. 4, 2002, now U.S. Pat. No. 6,595,778.

BACKGROUND

FIELD OF INVENTION

BACKGROUND OF THE INVENTION

It is well known that many primary students have difficulty in learning mathematics in our base ten system. Students also now need to become familiar with and learn to use a base two system but this is normally reserved for higher grades. The current invention provides a math manipulative system for teachers and students.

With this manipulative device, a child can both DO and SEE simple mathematical calculations.

SUMMARY OF THE INVENTION

The kit may be summarized as including a vertical cube stack with different sized angled sticks to allow a teacher to move cubes to indicate simple mathematical functions and their interrelations with the cubes allowing a student to actually visualize each operation. There is also available a Child training unit that allows the child to both do and see simple operations.

The current invention is comprised of a Cube Calculator™ mathematics manipulative device, its accessories, and related methods.

The Cube Calculator is a manipulative tool which has a plurality of slots, where each slot holds an object such as a colored cube. The slots are typically arranged in a stacked fashion so that each slot is presented from right to left relative to the student. By moving the object from a rest position, typically on the student's left, to an active position, typically on the student's right, the object represents a value associated with the slot. The value is typically assigned by a corresponding number line or numbered bar which has a plurality of indicia presented in proximity to the slots. For instance, the Cube Calculator may have 25 slots, and a numbered bar with the numerals 1 through 25 presented on the stick.

The Cube Calculator is arranged so that the items in the calculator are arranged in easily discernable groups of five. Typically, the grouping is by color, and alternately the distinctions between the groups of five may be made by texture, shape, or pattern. This grouping by fives creates a natural break for the human eye, and the human mind, which is complimentary to the base ten counting system of mathematics. The groupings may be rapidly examined. This grouping by five has many analogies including tally marks, Roman numerals, the five digits on a human hand, and the minute markings on the face of a clock.

For example, if you ask a small child to show you "seven", the child is likely to hold up five fingers on one hand and two fingers on another hand. It would be very unusual for the child to show three fingers and four fingers on another hand. This is the concept of "breaking" a number over multiples of five or ten. This breaking is useful in basic arithmetic operations and is closely related to the concepts of "borrowing" and "regrouping" in addition and subtraction problems.

When students manipulate the cubes, or other objects, in sets of five, the device reveals to them the efficient ways to break basic numerals around familiar multiples of five or ten. Technically this is called "making" and "breaking" the numerals into two "addends". For example if we were adding the number eight (8) to something there are several ways that we could break the particular eight that is being added- such as 7+1, 6+2, 5+3, 4+4, etc. If students are adding the number eight (8) to another number the most useful particular set of addends may change. For example when adding eight to sixteen, it is most convenient to first add four to get to the number twenty which is a multiple of ten and then to add the other four to get the answer twenty-four:

16+8=

16+(4+4)=

(16+4)+4=

20+4=24

On the other hand, if the number eight was added to the number twenty-four, then it is convenient to think of this eight as being first in a group of six and then an additional two. The first six getting to the number thirty which is a multiple of ten and the remaining two getting to the answer thirty-two:

24+8=

24+(6+2)=

(24+6)+2=

30+2=32

DESCRIPTION OF THE INVENTION

Figure 1:
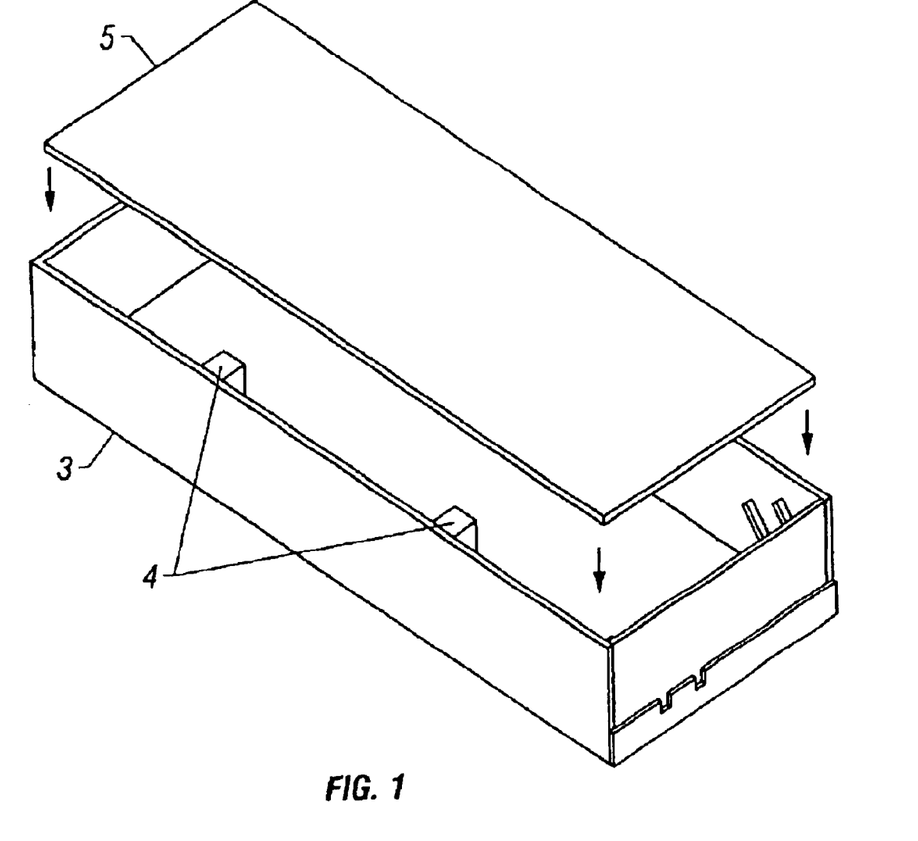
FIG. 1 shows a three dimensional view of a container for both the instructor unit and child training units.

The invention may best be described from the drawings. In FIG. 1 we see the container 3 with the upper side of a flat closure 5 that fits closely into the container 3 and is supported by posts 4 on internal sides of container 3. The instructor unit is attached to the underside of top 5 as shown in detail in FIG. 2.

Figure 2:
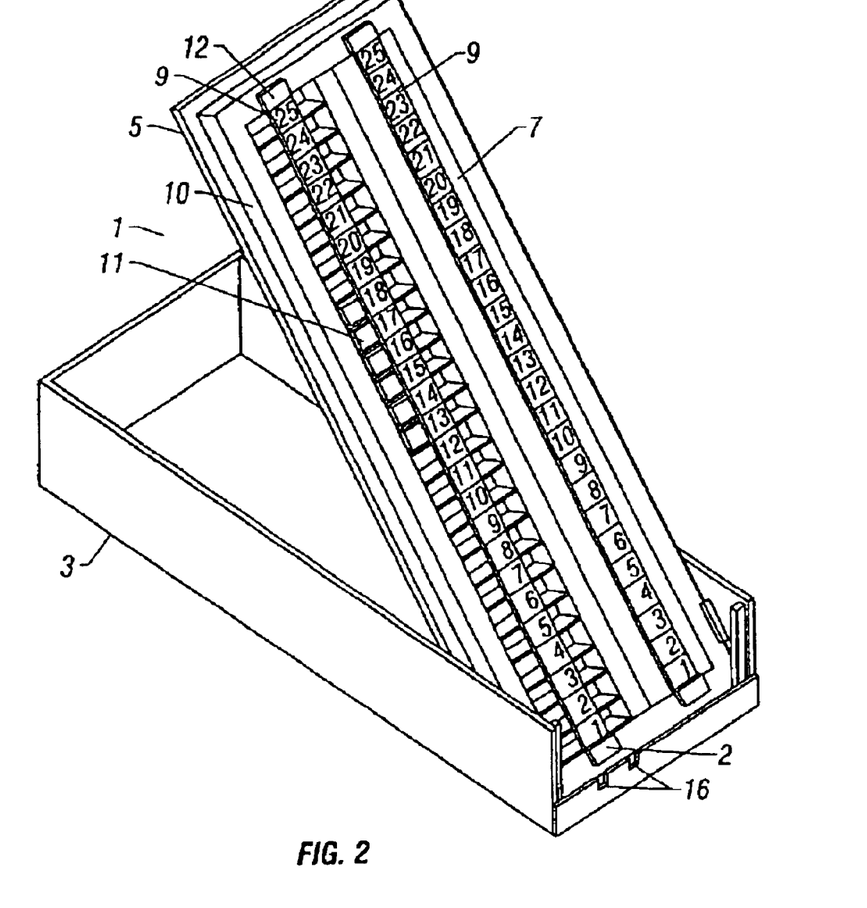
FIG. 2 shows a three dimensional view of an instructor teaching unit.

In FIG. 2 we see kit 1, box or container 3, and there is an angled slot on each interior side of the box (not shown) for sliding top 5 into a semi-vertical position. Teaching tray 7 is held on the underside of top 5. Number line stick 9 covers colored one inch cubes 11 in groups of five. Number 9 indicates one of several number line sticks that is removably held in place with holding units called holders 2 and 12. Holder 12 is an open one inch by one inch rectangular structure and holder 2 is a one inch by one inch cuplike structure both of which may be glued to teaching tray 7.

Figure 4:
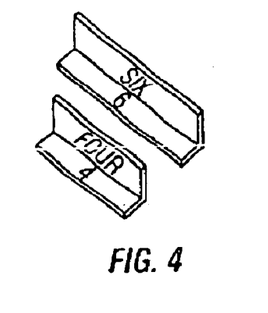
FIG. 4 shows two of a group of angle sticks sized from one to ten blocks in length.

We have shown teaching tray 7 held in a useable position by sliding back 5 in box 3. Number bridge 10 tray is held in place and we have chosen to show twenty five slots each about three inches in diameter and about ½ inch deep so that one inch cubes 11 may be slid to the center and hidden under number line stick 9 which is removably held in place by holders 12 and 2. Other numbers of slots could be used equally well. There are groups of five blue cubes in one group, five red cubes in a second group and five yellow cubes held in number bridge 10. Side 7 will hold a group of number line sticks and a group of angle sticks that are formed with angle sticks being one to ten cubes in length. Angle sticks are shown in FIG. 4. Although there will be two angle sticks of each length from 1 inch to 10 inches, for clarity only two are shown. Each angle stick is labeled on the interior side with the length in inches in word form on one side and in number form on the other side. These angle sticks are plastic and the instructor may label on the exterior sides to indicate fractions or percentages or numbers. For example when working with a total number of twelve a 4 inch angle stick could be labeled one third and the instructor could show that it takes three 4 inch angle sticks to equal the twelve. He could also show that one 4 inch angle stick equals 33⅓% and explain WHY! These labels may be put on with erasable marker to be easily removable. It might be shown when working with a total of eight numbers that this 4 inch angle stick then becomes ½ as a fraction or 50% as a percentage.

This aids in student learning through allowing easy linear and vertical visualization for the student.

Figure 3:
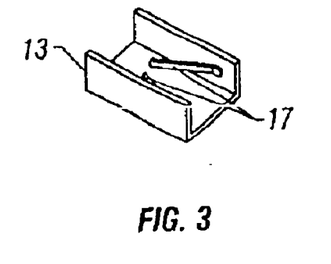
FIG. 3 shows a sweeper unit to hide blocks under a Number—line—stick.

FIG. 3 shows a sweeper unit 13 that may be placed upon and slid down the number bridge 10 to use flexible arms 17 to "sweep" or slide all blocks to be hidden in 3 inch wide slots as described under FIG. 2 under a number line stick 9. Slots 16 in the front portion of box 3 allow the sweeper unit 13 to exit to complete the movement of all the blocks.

FIG. 4 shows two angle sticks and there will be two groups of angle sticks from 1 to 10 inches in length with each group having some of the angle sticks stacked next to the right side of the cube slots in the Instructor unit and the remainder loosely held in container 3.

Figure 5:
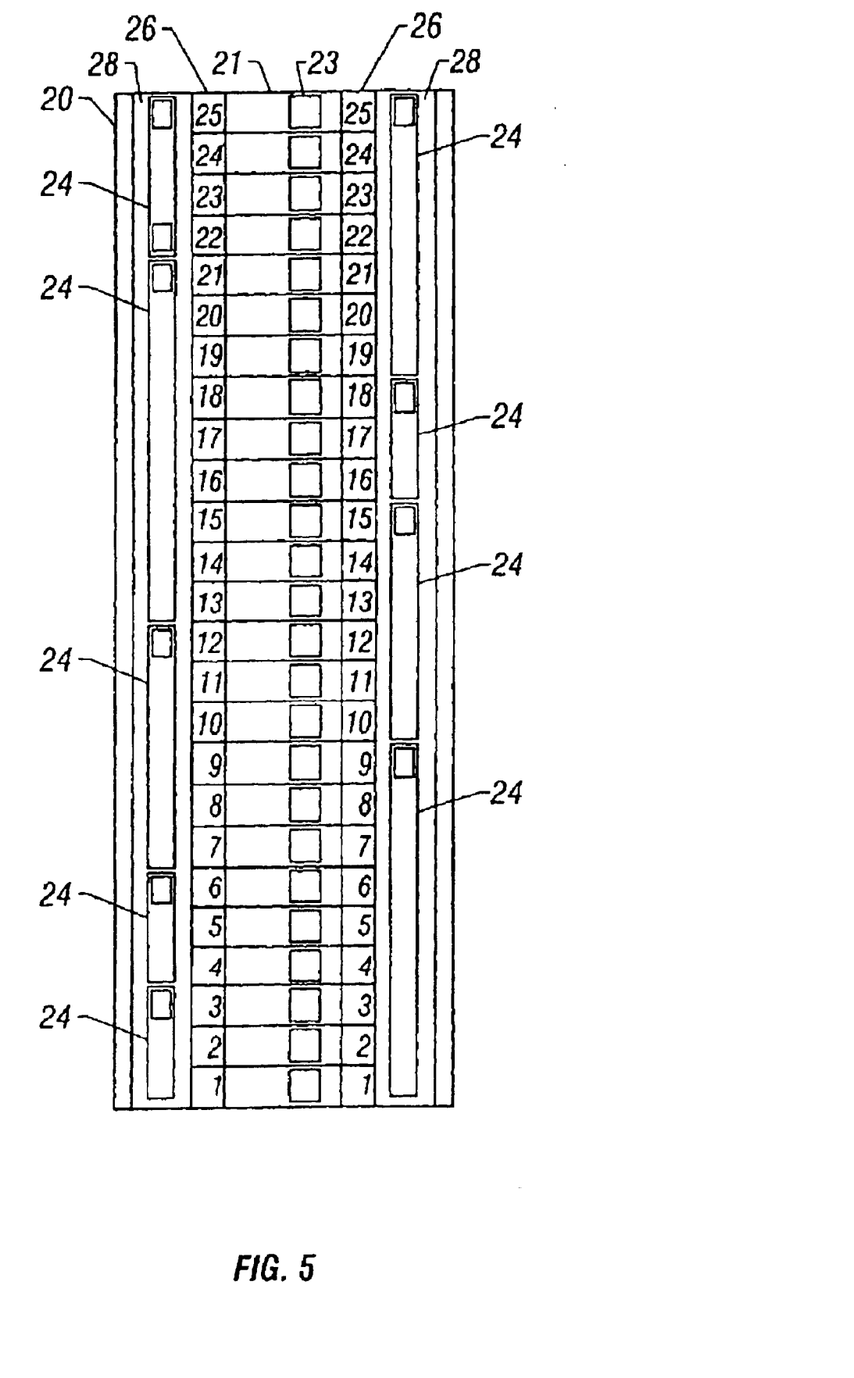
FIG. 5 shows a child training unit.

FIG. 5 shows a front view of a child teaching unit 20 that is about one half inch thick. The center unit 21 is a series of slots with each slot about one fourth inch deep and three fourths of an inch wide. We have chosen to show 25 slots but other numbers of slots could be equally useable. There are ⅜'s inch cubes 23 in the slots and each cube is finger slidable in each slot. The cubes are colored in groups of five. There is a flat stick holding slot on each side of center unit 21 with a flat stick therein numbered to form numbered stick 26 removably held on each side of the row of cubes with the numbers from 1 to 25 on the numbered stick 26 to provide a visual count of the cubes.

There is a Window stick holding slot 28 on each side of the numbered sticks 26. A window stick has a total length equal to the number of cubes listed on the stick but space for the upper cube is open both for ease of handling and to allow the user to read a number beneath. For example if window stick labeled 7 were laid with the bottom end on top the number 1 on the numbered stick the user would read the number 7 through the upper end of window stick 7. If all blocks were lined up as shown in the left position the user could use window stick 7 to shift seven blocks to the right position. Now if the user pushed 7 more blocks to the right he would read the number 14 on the number stick. He has just learned 7 plus 7 is 14. Now if the user laid window stick seven on top of the number stick with the window end of the end around 14 he could read 7 below the window stick and SEE that 14 minus 7 equals 7. He has learned that fourteen minus seven equals seven.

This illustrates a simple use of the Number and window sticks.

There will be a minimum of ten different length properly labeled window type number sticks 24 for each Child teaching unit in the kit or held in the stick holder 28. Sides of stick holder slot 28 are formed by raised segments of the unit base.

The unit FIG. 5 can be used in upper elementary grades to explore and solve algebraic equations. For example the Instructor may show the equation $X-7+4=Y$ and explain as the value of X changes then the value of Y changes. The Instructor may then say "Let's assume that the value of X equals ten." With the Number line stick 26 in place he can then use window stick 10 and push ten cubes to 'ten' and he can then use window stick 7 and slide over seven cubes to indicate minus 7 and he can then use window stick 4 and push back four cubes to indicate plus 4 and may count seven cubes left in line. In the equation he has modeled and physically shown that . . . If $X=10$ then $Y=7$. He can repeat and show that if $X=12$ then $Y=9$. He is SHOWING and MODELING. The students may then use their paper models or actual models to try different variations etc., etc. He has shown how to "VISUALIZE THESE CONCEPTS IN A LINEAR FASHION."

Detailed Description of the Embodiment—Cube Calculator

Figure 6:
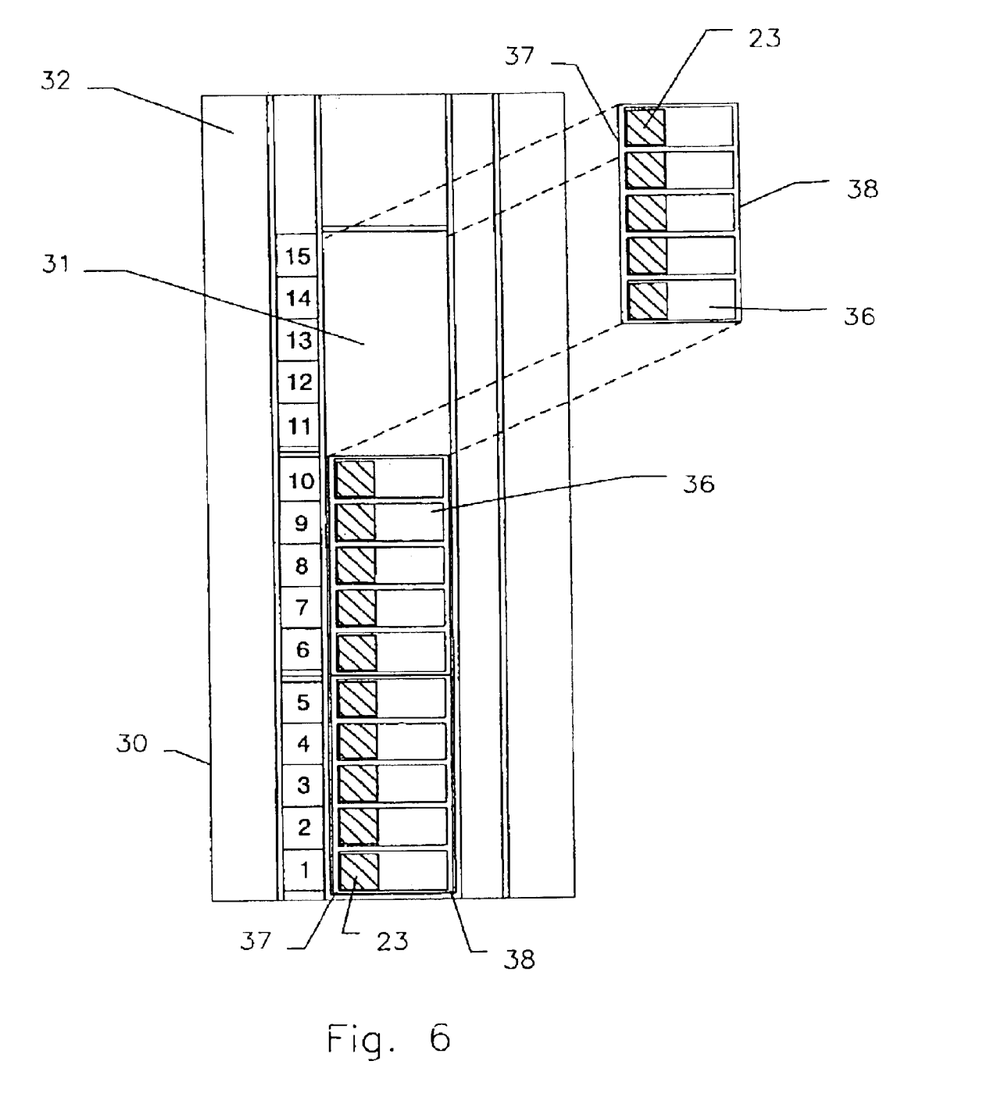
FIG. 6 is a perspective view of a cube calculator™ with slidable number bar and removable tally trays.

Referring now to FIG. 6, in this embodiment, the Cube Calculator™ 30 consists of fifteen slots arranged in the longitudinal recess 31 of a base 32. Each slot 36 accepts a cubic object 23 which can be moved from a first wall 37 of the slot to a second wall 38 of the slot. The slot is preferably more than two (2) but less than three (3) times the width of the cube. The height of the slots are preferably consistent and are less than the cube so that cube can be easily manually moved from one side of the slot to the other side.

In practice, a student loads the device by placing colored cubes in the slots. Preferably, each set of five (5) slots is loaded with a different color cube. According to FIG. 5, for instance, red cubes are loaded in the first set of five slots, which in this case correspond to the numbers one through five; blue cubes are loaded in the second set of five slots, which in this case correspond to the numbers six through ten; yellow cubes are loaded in the third set of five slots, which in this case correspond to the numbers eleven through fifteen.

In operation in this example, the cubes are moved to the left side of the slot and as the student manipulates the cubes to represent a number or mathematical operation the cubes are slide to the right side.

Example—Addition

For the student to view addition such as the problem eight (8) plus four (4); the first eight cubes are moved from the left to the right, representing the number eight (8) and then an additional four (4) cubes are slide from the left to the right representing the four (4), the student can then view the number twelve (12) being the answer to the problem eight (8) plus four (4).

Example—Subtraction

In this example the reverse of the addition is true. The student may view the subtraction of four (4) from twelve (12) by sliding the twelve (12) cubes to the right to represent the number twelve (12) and then moving back the top four (4) cubes to the left side, leaving the answer eight (8). Alternately, all cubes can be left on the left side, and the top four cubes representing 12, 11, 10, and 9 could be moved to the right.

The Cube Calculator is a simple device that permits students at a desk, table or the classroom floor to manipulate simple objects in order to understand mathematical concepts. Larger units can be used by a teacher in small groups and analogous product for an overhead can be used by a teacher on an overhead projector representing similar concepts.

The Cube Calculator lays the groundwork for making the transition to more abstract mathematical thinking. Younger children can use larger cubes while older students can use smaller cubes, and finally transition to paper models of the Cube Calculator.

The basic uses of the Cube Calculator includes simple counting, skip counting such as counting by threes (3) or fours (4) or fives (5), basic addition or basic addition with regrouping, basic subtraction or basic subtraction with regrouping, multiplication, and division and division with remainders.

Detailed Description of Embodiment—Twenty-five (25) Slot Cube Calculator

In this example a Cube Calculator consists of a set of twenty-five (25) rectangular slots arranged longitudinally along the relatively thin base, each of those longitudinal slots maybe grouped in sets of five (5) so that one or more tally trays 40 may be removed from the base for additional exercises. A longitudinal slot or number tray 35 adjacent to the cube trays holds a numbered bar 33 which may have indicia such as numbers or symbols corresponding to each slot, the numbered bar has four sides and may have separate numbers or symbols on each of the four sides. The number tray 35 may be opened on one end so that the numbered bar may be slid to another position which permits additional counting which enables higher numbers to be examined. In this example, a colored cube of length ⅜ inch is inserted in each slot, which is slightly wider than the cube. The slots have a length of about 2½ times the ⅜ inch cube, which permits room for the cube to be slid to one side in a visibly different position from the other side. Only two cubes can possibly be inserted in the slot so that when a tray is removed up to ten (10) but no more than ten (10) cubes may be inserted in the tray.

Example—Multiplication

In multiplication, for instance, three (3) times six (6), the student will move the first group of six (6) cubes to the right side, then keep a second group of six (6) cubes to the left, and then finally a third group of six (6) cubes is moved to the right side representing the number eighteen (18). When the grouping is complete, the groups are on opposite sides of the slots so that they can be easily distinguished. If the problem were six (6) times three (3), the student would move the corresponding set of six (6) groups of three (3) cubes still representing the number eighteen (18).

Example—Division

Division is a similar example, where eighteen (18) divided by six (6), the student will move three (3) groups of six (6) units and understand three (3) with no remainder. On the other hand if the problem were nineteen (19) divided by three (3), the student will position the 3 groups of 6 as before and then have 1 remaining cube. This one remaining cube represents a remainder of the division of 19 by 6.

The Cube Calculator can both model and calculate fractions of whole numbers, percentages of whole numbers, operation for multiples of ten (10), hundred (100), thousand (1000), etc. can teach place value, the way of saying numbers properly and making and changing the numbers in a large number such as described below.

Figure 7:
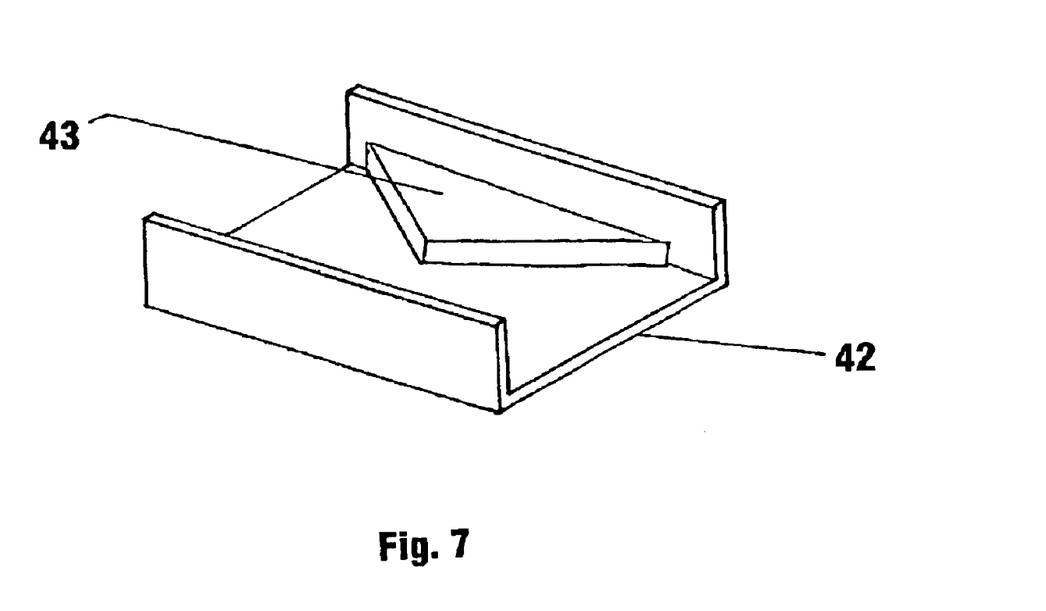
FIG. 7 is a bottom view of a sweeper with a triangular projection.

Referring now to FIG. 7, in this example a sweeper 42 fits over the cube trays and the number line tray and maybe slid down the length of the tray. The underside of the sweeper includes a triangular projection 43 which moves cubes to their left-most or right-most position in the cube tray, thereby in a single motion resetting the cubes to their zero position.

Base 10 Place Value

Figure 8:
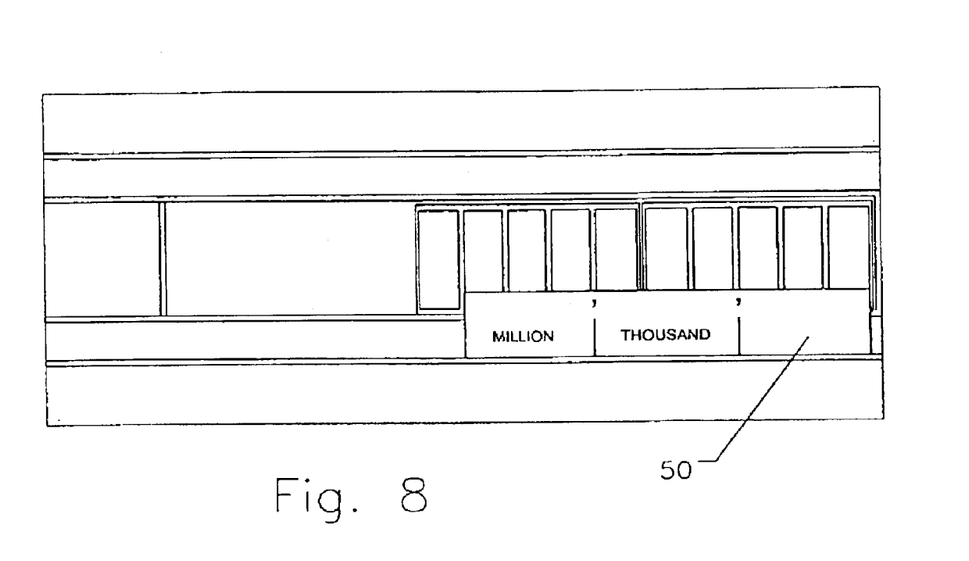
FIG. 8 is a top view of a cube calculator with a large number overlay.

In another use of the Cube Calculator, the tray is arranged horizontally on a desktop. Referring now to FIG. 8, a large number overlay 50 is provided on one end of the calculator such as showing the nine places of a nine digit number with commas and number cubes maybe inserted to provide any number between zero (0) and nine hundred ninety-nine million, nine hundred nine-nine thousand, nine hundred nine-nine (999,999,999). There are two types of cubes in this example, one cube has the numbers zero (0), one (1), two (2), three (3), four (4), and five (5) on any of the faces, the second cube has the numbers zero (0), one (1), and six (6) seven (7), eight (8), and nine (9). Therefore using one of the two cubes any number between zero (0) and nine (9) can be represented and by using combinations of the two cubes any number between zero (0) and nine hundred ninety-nine million, nine hundred nine-nine thousand, nine hundred nine-nine (999,999,999) can be represented. The student or teacher puts a number into some or all of the nine slots and then reads the value of the number, this embodiment is useful in learning how to say large numbers.

Base Two

Figure 9:
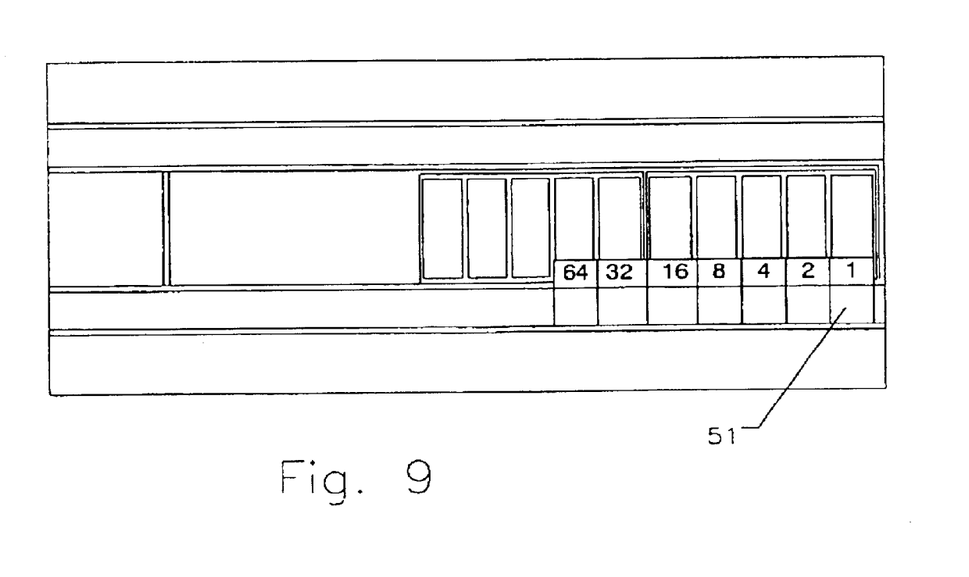
FIG. 9 is a top view of a cube calculator with a base 2 overlay.

Referring now to FIG. 9, a similar example or use can be provided with learning base two representation numbers. In this case each cube has a zero (0) or a one (1) on it and maybe placed in the slot and the overlay tab includes the numbers one (1), two (2) four (4), eight (8), sixteen (16), thirty-two (32), sixty-four (64), two hundred fiflty-six (256) etc. each representing a subsequent power of two so that the binary representation of any number maybe represented by the position of the cubes, either zero (0) or one (1) in each of the slots.

The Detailed Description of Embodiment— Removable Tally Trays and Mat

In this example the longitudinal recess supports twenty-five (25) slots of a Cube Calculator. The slots are arranged in groups of five (5) in trays that maybe removed from the center slot. Each of these trays is called a tally tray 40, and typically holds no more than ten objects.

Figure 10A:
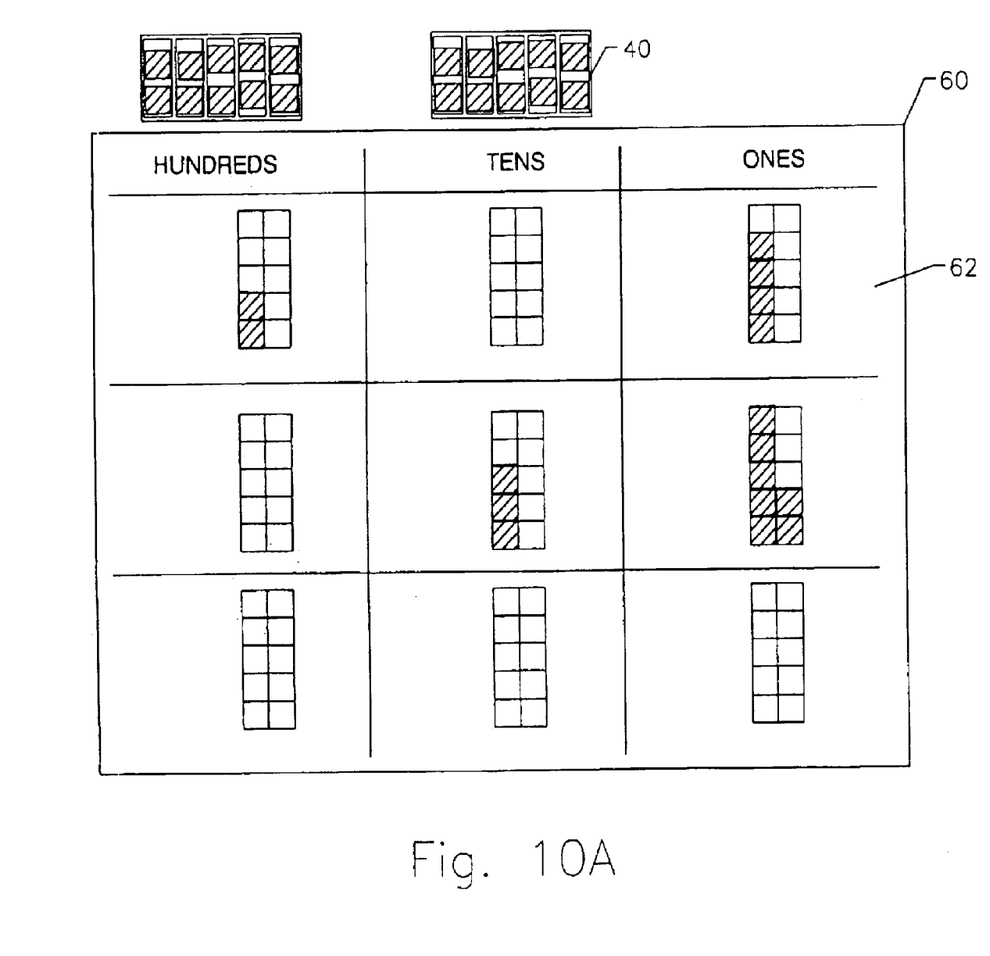
FIG. 10A is a top view of a mat with cubes illustrating a subtraction problem.

Referring now to FIG. 10A a flat preferably laminated mat 60 is provided. The mat has an upper row 62 of three blocks representing the hundreds' place value cells, tens' place value cells and ones' place value cells of a first number.

In this example, each of the place value cells has a grid representing ten positional cube locations. A tally tray may be placed next to the grid, or loose cubes maybe placed on the grid. The tally tray is used particularly to represent regroupings in subtraction or addition. For instance, when subtracting the number thirty-seven (37) from the number two hundred and four (204) as illustrated in FIG. 10, four cubes will placed in the ones slot upper row, no cubes in the tens slot and two cubes in the hundreds slot while in the bottom row seven cubes will be placed in the ones grid and three cubes will be placed in the tens grid. Students will observe that seven cubes cannot be removed from the upper ones quadrant because there are only four cubes in the slot, so that it is necessary to borrow or carry over from another slot to get those. This would be relatively straight forward if there were a cube available in the ten slot, but in this case the number in the ten place value cell is zero so it is necessary to do the regrouping in two steps.

Figure 10B:
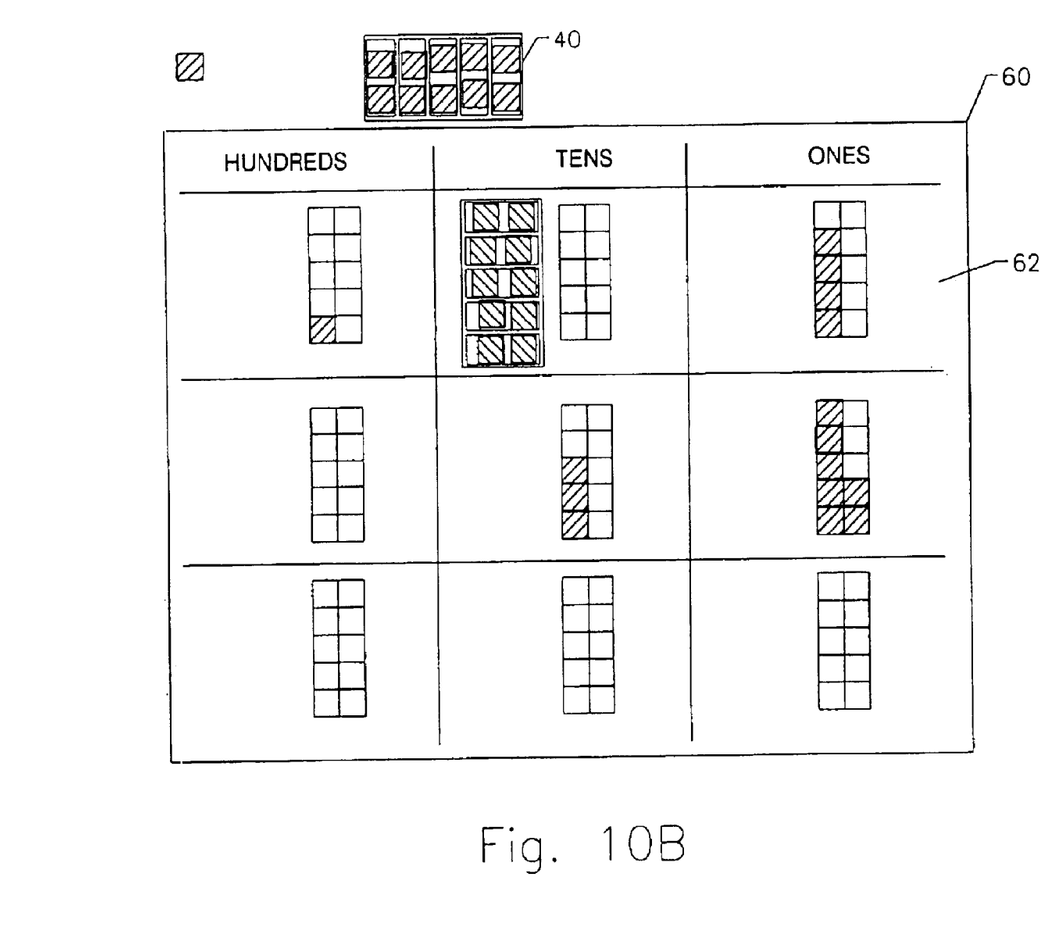
FIG. 10B is the mat of FIG. 10A showing a tally tray representing a regrouping operation.

Referring now to FIG. 10B, the student will take a tally tray 40, which has ten cubes in the tray, two in each of the five slots, take one of the two cubes away from the hundreds place value cell, and put a full tally tray of ten cubes in the upper ten's place value cell. Therefore the ten tens in the full tally tray will represent the one hundred that has been removed. Similarly the student can then take one cube from the tally tray that is now in the ten upper ten's place value cell and exchange or regroup it for a full tally tray of ten cubes to the one's place value cell and then there are fourteen cubes in the one's place value cell.

At this point the student will typically work the problem on paper, but could continue to manipulate cubes. In the paper version the student would understand that each of the place values in the answer is equal to the subtraction of the number of cubes in the second number's place value cell from the number of cubes in the first number's place value cell.

Detailed Description of Embodiment—Two Sided Mat

Figure 11:
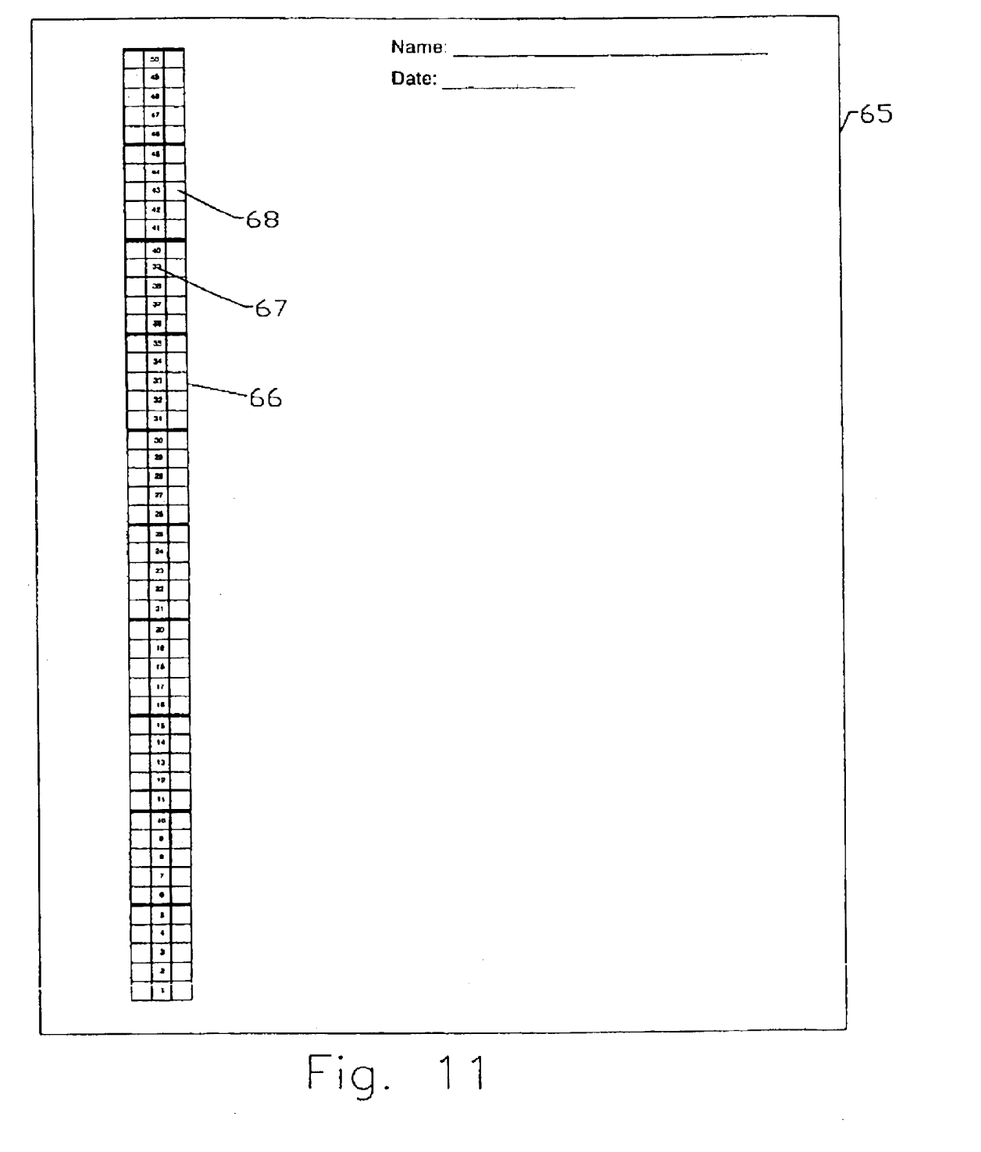
FIG. 11 is a top view of the second side of the mat of FIG. 10A.

On one side the mat includes the grid described in the subtraction problem above. The other side 65 includes a representation of a large Cube Calculator 66. In this example, fifty (50) elements are shown and there are boxes 68 on either side of the enumerated column 67 of numbers. In order to represent an addition the student would take an erasable marker and draw a line representing the first number for instance if the problem was fourteen (14) plus eleven (11) the student would mark a first line from one to fourteen on one side of the column for instance on the right and then on the left column starting with number fifteen would add additional eleven columns up to the number twenty-five (25) which would represent the answer.

Other problems such as multiplication addition and subtraction follow in a similar manner as described earlier. This tool represents a step toward the abstraction of numbers whereas in the Cube Calculator example the students are manipulating physical objects, in this example they are manipulating a number line which is a step closer to pure abstract mathematics which is the eventual goal.

Window sticks 34 may be used with the mats. For instance a "4" window stick may be used with the mat by placing the window end of the window stick over the number 12 and the other end of the window stick above the number 8 to represent the operations "8+4=12" or "12−4=8".

Figure 12:
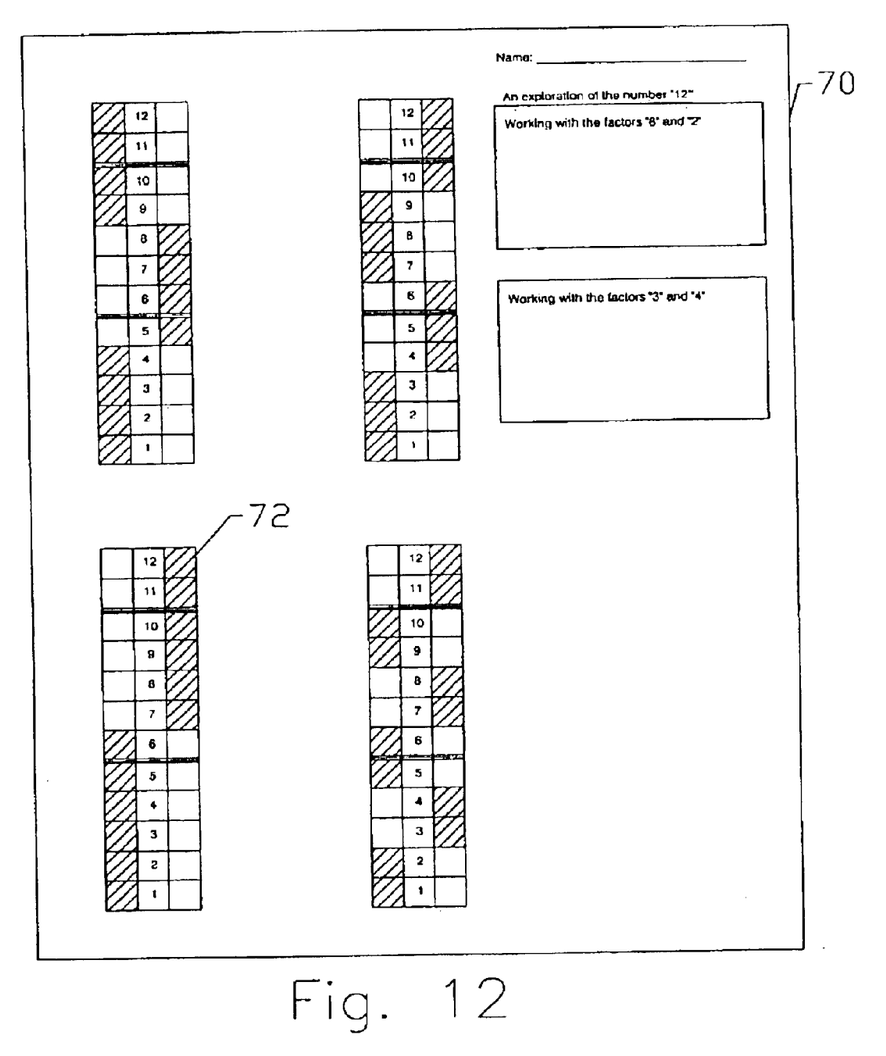
FIG. 12 is a top view of a workbook sheet.

A workbook sheet 70 may also be used with the system. The student may remove and color one or more sheets which represent a Cube Calculator. By coloring in the squares 72 on the workbook page, the student can demonstrate the operations. For instance, the product "4×3" may be represented by coloring the squares for 3 groups of 4. By coloring in squares they can model efficient addends for a given situation, using the cube calculator to guide them. For instance, when adding the number 6 to the number 18, they would color in two squares (representing cubes) with one color, and then the next 4 squares with another color.

Detailed Description of Embodiment—Pair of Cube Calculators and Array Tray

Figure 13:
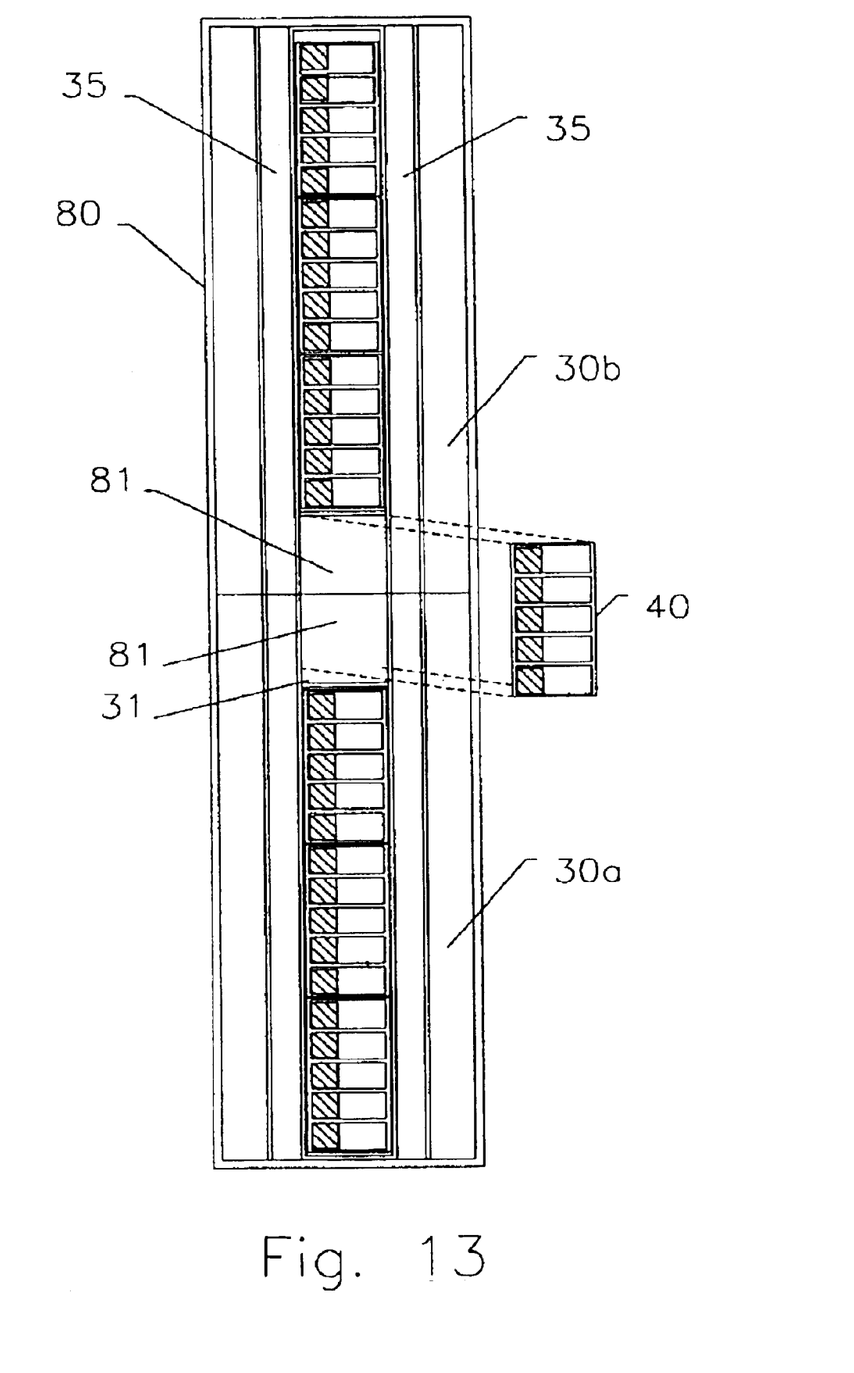
FIG. 13 is a top view of two cube calculators arranged in an array tray.

Referring now to FIG. 13, in this embodiment, each student is provided with a bag containing a Cube Calculator and various colors of cubes. The Cube Calculator in this embodiment includes 3 removable tally trays 40 of 5 slots each, and an extra area 81 at the top of the longitudinal recess 31 which has a length of half of a tray length. This size of Cube Calculator fits in a one-gallon reclosable plastic bag, so that a bag for each student in a classroom can be conveniently maintained in a single box or container and easily distributed to students. The Cube Calculator is preferably symmetric from side to side with a number tray 35 provided on each side of the slots. This symmetry permits both left and right handed operation, and also permits two numbered bars to be used at the same time. For instance a first numbered bar may be oriented in a first direction showing the numbers 1–15, and the second numbered bar may be used in reverse so that a problem of "10–3" may be observed as starting with the cube adjacent to the number "10" on the first numbered bar, and counting down 3 cubes on the second numbered bar which is oriented so that the 1, 2, and 3 of the second numbered bar are at the same slot as the 10, 9, and 8 of the first numbered bar respectively.

An array tray 80 is a tray that has an internal width of slightly greater than the Cube Calculator, and an internal length of slightly greater than twice the length of a Cube Calculator. A first Cube Calculator 30a is inserted in the array tray so that its extra area is positioned in the middle of the array tray. A second Cube Calculator 30b is then inserted in the array tray so that its extra area is positioned in the middle of the array tray so that the extra areas of the first and second Cube Calculators provide a space for inserting a tally tray 40. The walls of the array tray are preferably the same height as the height of the base of the Cube Calculator when the Cube Calculator is inserted into the array tray. In this manner, the pair of Cube Calculators provide a 35- slot device with 7 tally trays. Students may work alone or in pairs with the device.

Figure 14:
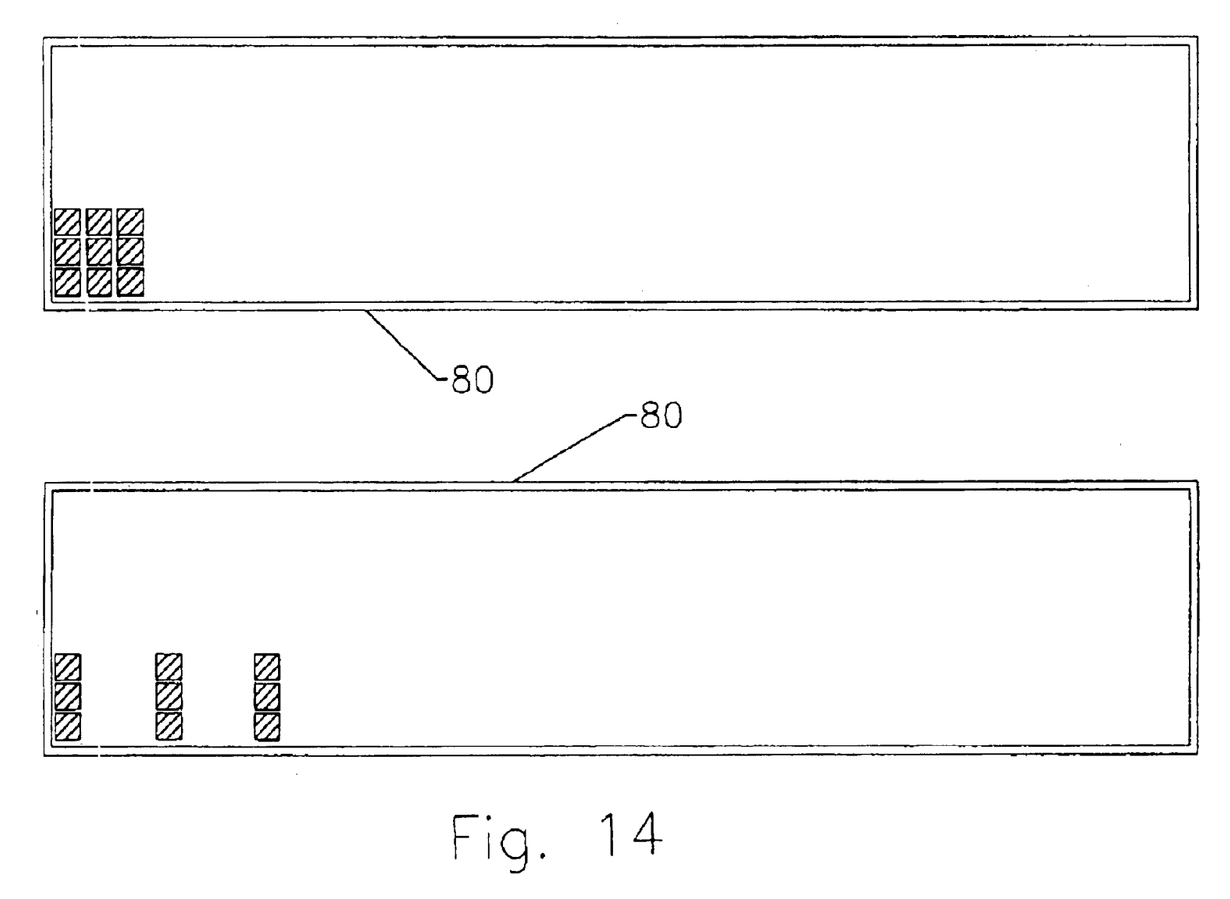
FIG. 14 is a top view of an array tray with loose cubes.

The array tray 80 may also be used for holding loose cubes. The cubes may be arranged in squares or rectangles, such as shown in FIG. 14. A square is a graphical representation that 2×2=4; 3×3=9; 4×4=16, 5×5=25, etc. The squares may also be rapidly moved apart, such as in columns, to demonstrate the factors. For instance, a square of 16 cubes can be arranged in 4 columns of 4 cubes. A grouping of 12 cubes can be arranged as 2 columns of 6, 6 columns of 2, 3 columns of 4, etc, to show different factors for the number 12. This example uses cubes to demonstrate number values without a specific numbered bar labeling, and the ability to recognize number values without the numbered bar is a step toward working with numbers as an abstraction. In a related exercise, the Cube Calculator can be used without a numbered bar. For instance students may be shown a number of cubes slid to one side of their trays, and quickly recognize the value of the number. The grouping of cubes by fives and color differentiation enable this quick recognition.

Detailed Description of Embodiment—Teacher Demonstration Unit

Figure 15:
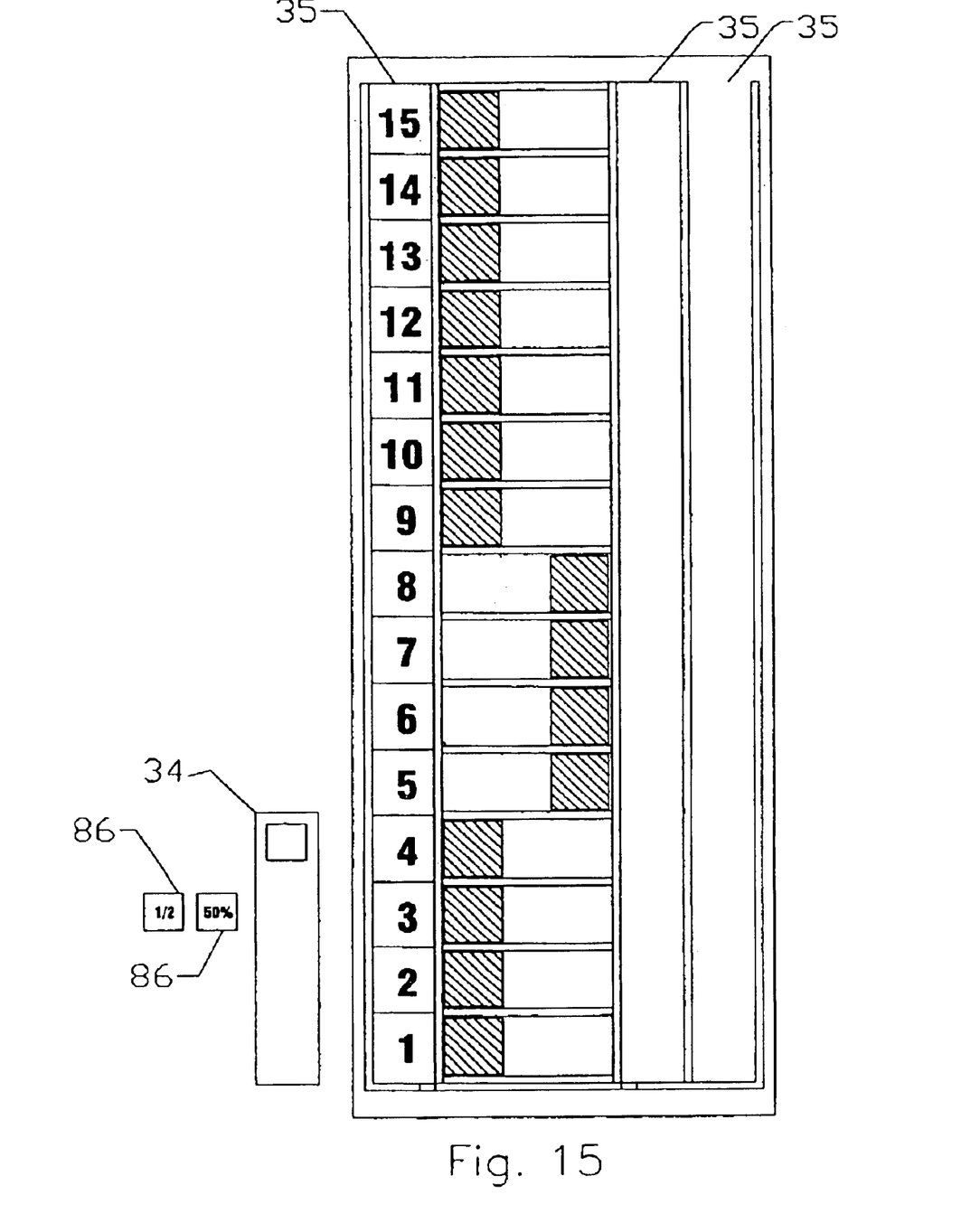
FIG. 15 is a top view of a teacher unit with a window stick and a fraction tile.

Referring now to FIG. 15, in this embodiment, a large Cube Calculator, such as a 15 slot device with 1" slots, is used for the teacher to demonstrate to small groups. The sweeper may be placed upon the device to cover the slots above the number of interest.

A window stick 34 may be placed in proximity to a number tray 35. The window stick may have a removable label tile 86, such as "½" or "⅓" etc. that can be inserted in the window stick to represent the fraction of a number that the window stick length represents.

The Window Sticks may be used in several ways: To show addition and subtraction; To 'sweep' a given number of cubes left or right in order to both model and DO the operations (multiplication, division, addition, subtraction); To accept a 'fraction tile' or 'percentage tile' in their window, which shows their value in relation to a given whole number that we are working with (for example, a window stick of '4' would be equal to ½ of 8, but it would only be ⅓ of 12). A window stick can also be used as a crosspiece to hold up the sweeper while we work with a chosen number of cubes below the sweeper.

What is claimed is:

1. A Child training unit comprising;
a) a flat rectangular base,
b) a cube holding unit linearly and centrally located in said base comprising a maximum of about twenty six slots sized to be about ⅜ inch apart, ¼ inch deep and ¾ inch wide, at least a portion of the slots being configured in a removable tray, such that the tray can be removed from the base;
c) ⅜ inch cubes, each sized to slide smoothly in one of said slots;
d) a minimum of two stick holding slots on each side of said cube holding unit, each of said stick holding slots being formed from a narrow raised segment of said base;
e) a flat stick sized to slidably fit into one of said stick holding slots with numbers one to twenty six on said flat stick with each of said numbers being located to be beside one of said twenty six slots when said flat stick with said numbers thereon is located in one of said stick holding slots beside said cube holding unit;
f) a minimum of ten window sticks, a window stick having a about a three eighths square opening on one end to facilitate handling and reading a number through said opening, each of said window sticks being labeled with a number indicating a total number of cubes that said stick including said window therein could cover.

2. A mathematics manipulative device comprising
a base;
an indicia scale;
a plurality of sets of objects, each object having a width, height, and length, each set of objects comprising
five objects having a distinguishing feature to permit the group to be easily distinguished from a different group of five objects; and
a plurality of rectangular open slots arranged in proximity to the indicia scale, each slot having
a first side wall,
a second side wall,
a width slightly greater than the width of the objects,
a height less than the height of the objects, and
a length more than twice the length of the objects and less than three times the length of the objects,
such that objects may be slid from the proximity of the first side wall to the proximity of the second side wall.

3. The device of claim 2 wherein
the distinguishing feature of a set of objects is selected from the group consisting of visual color, visual pattern, visual shape, tactical shape, and tactical texture.

4. The device of claim 2 wherein
there are at least fifteen slots.

5. The device of claim 2 wherein
there are twenty-five slots.

6. The device of claim 2 wherein
the indicia scale is a numbered bar of square cross section such that the numbered bar has four faces, and the numbered bar is removable from the base so that any of the four faces may be presented in proximity to the slots.

7. The device of claim 2 wherein
the indicia scale is slidable with respect to the base so that the particular indicia associated with a slot may be changed by sliding the scale with respect to the base.

8. The device of claim 2 wherein
at least one tally tray of adjacent slots is removable from the base, such that the tally tray and the objects in the tally tray can be removed from the base.

9. The device of claim 2 wherein
there are a plurality of removable tally trays of five slots, such that each slot can hold no more than ten objects.

10. The device of claim 2 further comprising
a removable sweeper such that the sweeper may be moved along the slots to reset the objects to the proximity of the first side wall.

11. The device of claim 2 wherein the sweeper further comprises
a slide comprising
a top portion such that the top portion may slide over the top of objects in the slots in a path substantially perpendicular to the length of the slots, the top portion having a lower surface facing toward the slots, and a pair of supports; and
an angled protrusion extending from the lower surface of the top portion, such that when the slide is moved over a slot, the angled protrusion is positioned above the slot and below the top of an object in a slot, thereby permitting the angled protrusion to engage the object and to move the object to the proximity of the first side wall.

12. The device of claim 2 further comprising
a plurality of removable window sticks of variable length, the length of each window stick being approximately equal to the combined width of a positive number of slots, such that each window stick has a first end with a hole, and a second end, such that a window stick may be placed over a portion of the indicia scale such that the scale may be read through the hole.

13. A mathematics manipulative system comprising
a plurality of objects having a width, height, and length;
a manipulative device comprising
a base;
an indicia scale;
a plurality of slots arranged in proximity to the indicia scale, each slot having a width slightly greater than the width of the objects,
a height less than the height of the objects,
a length more than twice the length of the objects and less than three times the length of the objects,
such that at least one tray of five adjacent slots is removable from the base; and a student mat comprising a first surface having a grid of place value cells comprising at least two rows and at least two columns,
the first row of the grid having place value cells representing at least the one's and ten's place value for a first number, and
the second row of the grid having place value cells representing at least the one's and ten's place value for a second number, such that objects may be placed in the place value cells in a manner that the number of objects in each cell represents the value associated with the respective place of the number associated with the cell, and such that a tray holding ten objects may be placed in a cell so that a base ten regrouping operation can be represented, for example, by removing an object from a number's hundred's place value cell and placing a tray of ten objects in the number's ten place value cell.

14. The system of claim 13 wherein
the mat has a second erasable surface, such that the second surface provides a graphical representation of an indicia scale and slots in a manipulative device, such that objects in the slots may be represented by marks on the second surface.

15. The system of claim 13 further comprising
a substantially transparent teacher's mat similar to the student mat, such that the teacher's mat may be projected with an overhead projector to a display.

16. The system of claim 15 further comprising
at least one tally tray, each tray comprising
five slots for holding no more than two objects each, and
a generally transparent bottom surface, such that when a tray is placed on an overhead projector, the tray contents are visible on a display.

17. A mathematics manipulative system comprising
a plurality of objects having a width, height, and length;
a plurality of tally trays, such that a tally tray has five slots and each slot may hold up to two objects;
a first manipulative device and a second manipulative device, each device comprising
an indicia scale,
a base including a longitudinal recess having a length such that when three tally trays are placed in the recess, there is a surplus recess length of approximately one-half the length of the tally tray; and an array tray having a longitudinal receptacle with a length approximately equal to the combined length of the first manipulative device and the second manipulative device, such that the first manipulative device and the second manipulative device may be positioned in the receptacle with the surplus recess length of the first manipulative device positioned in proximity to the surplus recess length of the first manipulative device, such that seven tally trays may be positioned in the combined longitudinal recesses of the first manipulative device and a second manipulative device.

* * * * *